United States Patent Office 2,996,274
Patented Aug. 15, 1961

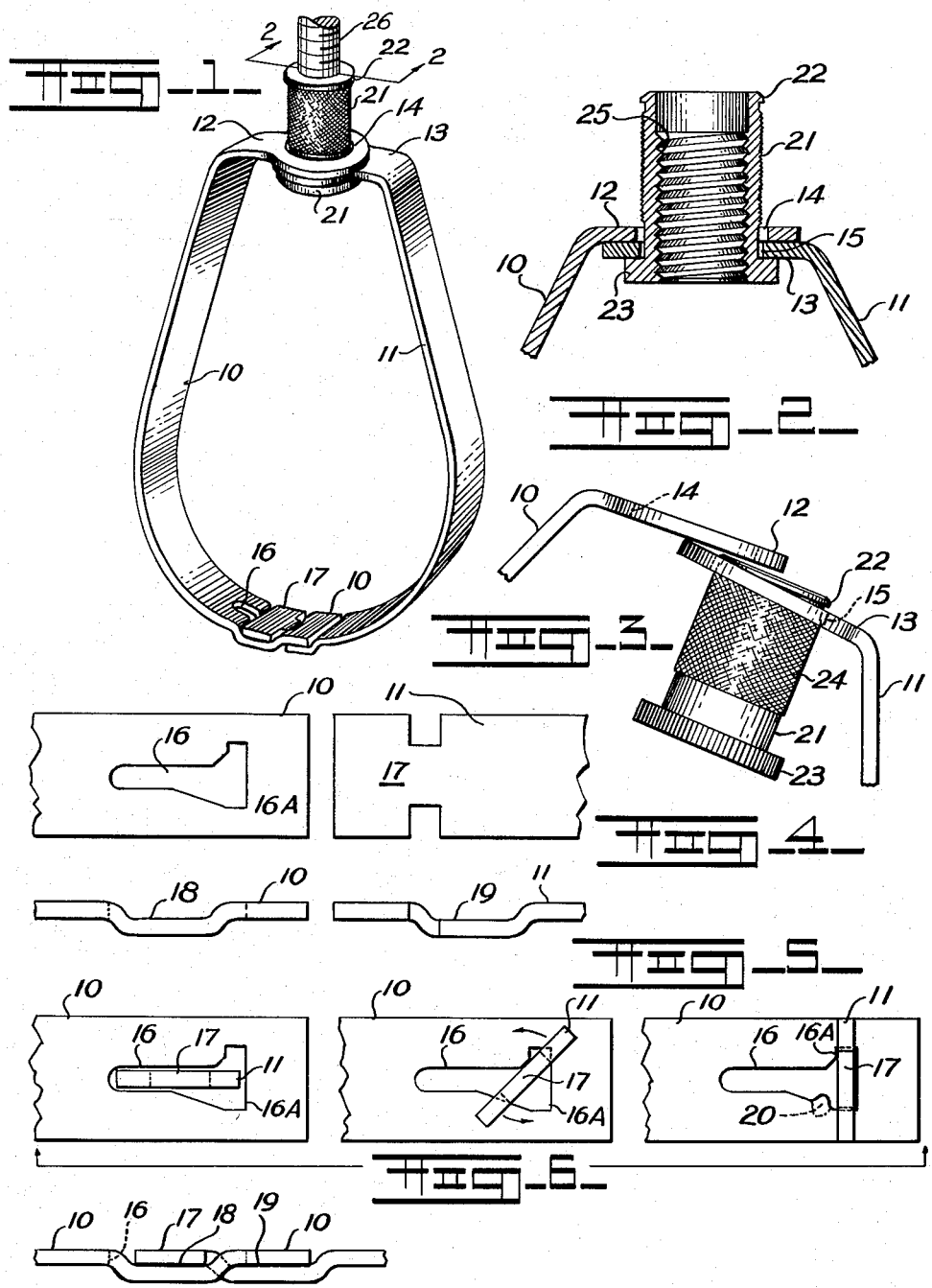

2,996,274
PIPE HANGER

Henry J. Marik and William R. Katis, Youngstown, Ohio, assignors to Automatic Sprinkler Corporation of America, Youngstown, Ohio, a corporation of Ohio
Filed Sept. 9, 1959, Ser. No. 838,998
3 Claims. (Cl. 248—62)

This invention relates to a pipe hanger and more particularly to an improved pipe hanger which may be positioned about a pipe to be suspended, moved to closed position and secured to a supporting rod in a simple easy to use manner.

The principal object of the invention is the provision of a simple lightweight relatively strong pipe hanger which may be placed in operative position with a minimum of effort.

A further object of the invention is the provision of a pipe hanger having several component parts joined to one another in movable relation to form a permanent assembly.

A still further object of the invention is the provision of a pipe hanger which may be formed of simple sheet metal stampings and a single machined part.

A still further object of the invention is the provision of a pipe hanger in which the pipe encircling portions are joined to one another in an improved hinge construction.

The pipe hanger disclosed herein comprises an improvement in the art relating to pipe hangers, primarily the device of the invention is of lightweight and simple construction and hence capable of being produced at a lower cost than pipe hangers heretofore known in the art. In addition, the pipe hanger disclosed herein comprises an assembly of only three parts, two of which form a pipe encircling band and are hinged to one another with an improved hinge structure with the third part being rotatably positioned through an opening in one of the pipe encircling parts and engageable through an opening in the other of said parts.

Pipe hangers heretofore known have generally comprised cast or forged machine parts of relatively heavy cross section sometimes having hinges including hinge pins. The present invention forms the pipe encircling parts as simple stampings of sheet metal which are interlocked by a T-shaped tongue and a transverse and longitudinally extending slot in the respective pipe encircling parts and having portions adapted to be engaged over a rotatable flanged bushing which is internally threaded and directly receives a threaded support rod. A workman can position the pipe hanger disclosed herein around a pipe, snap it into locked position thereabout and engage it on the threaded support rod in a minimum of time and with a minimum of effort and with only one hand thereby enabling the workman to position the pipe hanger with a degree of ease and simplicity not heretofore possible.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the pipe hanger.
FIGURE 2 is an enlarged vertical section on line 2—2 of FIGURE 1.

FIGURE 3 is an enlarged detailed elevation of parts of the pipe hanger shown in FIGURE 1.

FIGURE 4 is a view of the end portions of two of the parts of the pipe hanger shown in FIGURE 1.

FIGURE 5 is a side view of end sections of the pipe hanger shown in FIGURE 4.

FIGURE 6 is a series of three views illustrating the manner of assembling the two parts of the pipe hanger shown in FIGURES 1, 4 and 5.

FIGURE 7 is a side view of the assembled parts of the pipe hanger shown in FIGURES 4, 5 and 6.

By referring now to the drawings and FIGURE 1 in particular it will be seen that a pipe hanger has been disclosed which comprises a pair of oppositely disposed curved arms 10 and 11 each of which has oppositely disposed inturned end portions 12 and 13 which are apertured at 14 and 15 respectively. The opposite ends of the arms 10 and 11 are provided with a slot 16 and a T-shaped end 17 respectively, as best seen in FIGURE 4 of the drawings and the adjacent portions of the arms 10 and 11, which are formed of stamped sections of sheet metal, are depressed as indicated at 18 and 19 respectively in FIGURE 5 of the drawings.

The T-shaped end 17 of the arm 11 is adapted to be turned at right angles to the longitudinal plane of the arm 10 and positioned through the slot 16 which is of a length sufficient to pass the side dimension of the end 17 of the arm 11 and permit it to be rotated therein to join the ends of the arms 10 and 11 into substantial end to end overlapping arrangement as seen in FIGURES 1 and 7 of the drawings.

By referring to FIGURE 6 of the drawings it will be seen that the end 17 of the arm 11 is positioned in the slot 16 in the end of the arm 10 and moved partially therethrough. In the middle figure of the group comprising FIGURE 6 the T-shaped end 17 of the arm 11 will be seen to be turned approximately 45 degrees from the position shown in lefthand figure of the group comprising FIGURE 6. In the righthand figure of the group comprising FIGURE 6 the T-shaped end 11 will be seen to be positioned transversely in the widened end 16A of the slot 16 and a portion 20 of the material of the arm 10 moved into the area of the slot 16 by peening the same so that the metal moved into the slot 16 reshapes the slot into a general T-shaped end thus engaging the T-shaped end 17 of the arm 11 in the transversely extending end portion 16A of the slot 16. The arms 10 and 11 are thus joined to one another with substantial areas on either side of the portion 16A of the slot 16 comprising relatively large structural areas joining the relatively large structural area of the end of the arm 11 defining the T-shaped end 17 thereof.

By referring again to FIGURE 1 of the drawings it will be seen that the construction thus disclosed provides a hinge without a hinge pin and a movable structure which cannot be disengaged accidentally or purposely. The opposite ends of the arms 10 and 11 are indicated at 12 and 13 and apertured as at 14 and 15 and so arranged and positioned as to be capable of overlying one another as shown in FIGURES 1, 2 and 3 of the drawings. By referring to FIGURE 2 it will be observed that the aperture 15 is relatively smaller than the aperture 14 and that a flanged cylindrical coupling 21 is positioned therethrough with a flange 22 thereof formed after the coupling 21 has been positioned through the aperture 15 in the arm 11 so that the coupling 21 is rotatably mounted with respect to the arm 11 and held in the aperture 15 thereof. The aperture 14 in the end 12 of the arm 10 being relatively larger than the aperture 16 and of a larger diameter than the flange 22, the aperture 14 is capable of being moved into position in alignment with the coupling 21 so that the coupling 21 including the flange 22 may be moved through the aperture 14 as shown in FIGURE 2 of the drawings. The coupling 21 has an enlarged flange 23 on its opposite end and a portion of the intermediate area of the coupling 21 is knurled as at 24. Thus when the coupling 21 has been moved through the aperture 14 in the arm 10 into the position shown in FIGURES 1 and 2 the arms 10 and 11 are held thereby in encircling relation with respect to a pipe (not shown) positioned therethrough. The coupling 21 being internally threaded as at 25 may then be rotated upon the end of a threaded support rod 26 and which comprises a support for the pipe hanger. In this connection it will be observed that the upper inner surface of the coupling 21 is not threaded so that it forms a guide for engaging the end of the threaded rod (not shown) and facilitates the positioning of the device thereon.

The manner of installation which is unique with the present pipe hanger is as follows: The pipe hanger is received as shown in FIGURE 1, the arrangement of the joining ends of the arms 10 and 11 being such that a small degree of tension exists when the apertures 14 and 15 are in registry, upon the arms 10 and 11 being urged toward one another the tension clamping effect on the coupling 21 is released and the coupling 21 drops freely through the aperture 14 in the end 12 of the arm 10, as shown in FIGURE 3 of the drawings, whereupon the arm 10 may pivot downwardly and outwardly to the left so that the workman can then readily position the pipe hanger about a pipe to be suspended thereby, whereupon the arm 10 is swung back to the position shown in FIGURES 3 and 2 respectively which permits the coupling 21 to be pushed through the aperture 14 in the end 12 of the arm 10 to the position shown in FIGURES 1 and 2. It then may be readily rotated to engage the threaded support rod 26 heretofore mentioned.

It will thus be seen that an extremely simple and efficient pipe hanger has been disclosed which meets the several objects of the invention and having thus described our invention, what we claim is:

1. A pipe hanger comprising a pair of sheet metal arms each of which has an inturned apertured end, the aperture in one of said inturned ends being relatively larger than the aperture in the other of said inturned ends, a cylindrical coupling of a diameter slightly smaller than the diameter of the smaller one of said apertures positioned through said inturned apertured ends, said cylindrical coupling having an outturned flange about its lower end, the diameter of said outturned flange being larger than the largest one of said apertures in said inturned ends, said cylindrical body member having a secondary outturned flange about its upper end, said secondary flange being of lesser diameter than the larger one of said apertures in said inturned ends and smaller than the aperture in the other of said inturned ends so that said cylindrical coupling will be retained in one of said inturned apertured ends and may be disengaged from the other of said inturned ends, said cylindrical coupling being threaded internally, the other ends of said sheet metal arms being arcuate and having engaging formations comprising oppositely disposed cut-away areas in the sides of one of said arms defining a T-headed end thereon and the other end of said arms being slotted longitudinally and transversely adjacent its end and wherein said T-headed end of one arm is positioned through said elongated slot in said other arm and partially turned to a position cross wise of said transverse slot and wherein the areas of said arms adjacent said engaging formations are depressed to form offset sections therein.

2. The pipe hanger set forth in claim 1 and wherein the diameter of the cylindrical coupling between said flanges on the upper and lower ends thereof is uniform.

3. A pipe hanger including a metal strap formed of two sections hingedly secured to one another and having apertured end portions bent at oppositely disposed angles with respect to one another acting to place said end portions in parallel superimposed relation, a threaded support rod and a cylindrical body member threadably engaged on said support rod, said cylindrical body member having an outturned annular flange about its lower end and a secondary outturned annular flange about its upper end, said secondary outturned annular flange being of substantially smaller diameter than said first-mentioned flange, the apertures of said apertured end portions being of different diameters, both of said apertures being smaller than the diameter of said first-mentioned flange on the lower end of said cylindrical body member and one of said apertures being of a smaller diameter than said secondary annular flange on the upper end of said cylindrical body member and acting to permit the other one of said inturned apertured ends to be disengaged over said secondary annular flange to free the same from said cylindrical body member.

References Cited in the file of this patent

UNITED STATES PATENTS

| | | |
|---|---|---|
| 906,806 | Kortick | Dec. 15, 1908 |
| 1,529,881 | Engle | Mar. 17, 1925 |
| 1,579,418 | Tomkinson | Apr. 6, 1926 |
| 2,893,670 | Adams | July 7, 1959 |